July 2, 1963

J. L. THOMAS 3,095,585

TRAILER MECHANISM

Filed Feb. 19, 1962

*INVENTOR.*
JOHN L. THOMAS

BY

Chester W. Brown

ATTORNEY

July 2, 1963 J. L. THOMAS 3,095,585
TRAILER MECHANISM
Filed Feb. 19, 1962
2 Sheets-Sheet 2
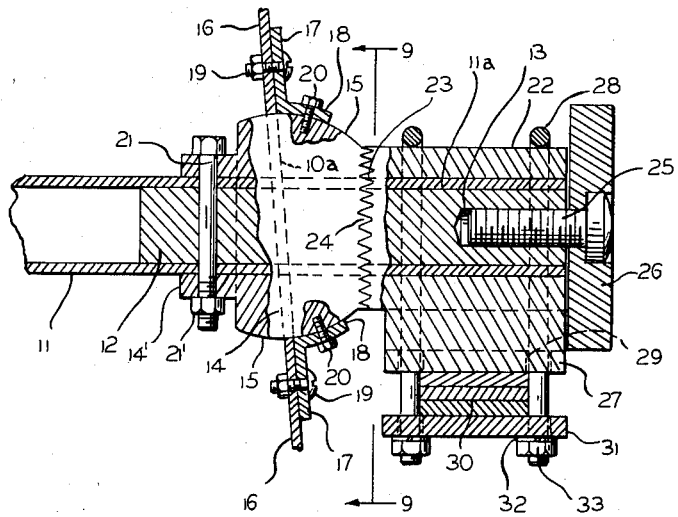
FIG. 5
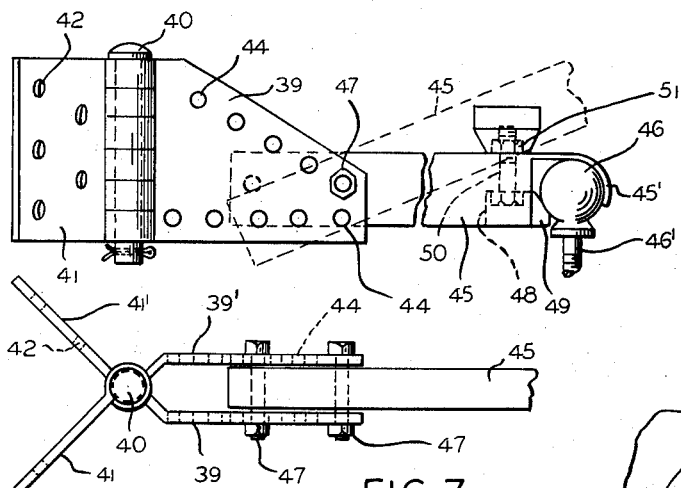
FIG. 6
FIG. 7
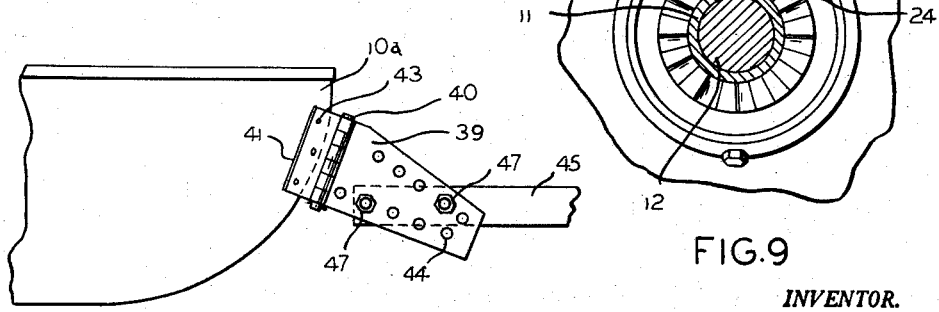
FIG. 8
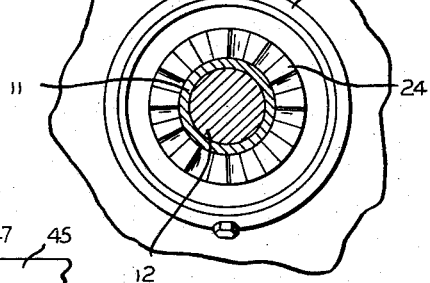
FIG. 9
INVENTOR.
JOHN L. THOMAS
BY
Chester M. Brown
ATTORNEY

United States Patent Office 3,095,585
Patented July 2, 1963

3,095,585
TRAILER MECHANISM
John L. Thomas, 2259 N. 65th St., Wauwatosa, Wis.
Filed Feb. 19, 1962, Ser. No. 174,169
1 Claim. (Cl. 9—1)

My invention relates to trailers, and more particularly to trailers for transporting small boats or the like on highways.

The principal object of my invention is to provide an adjustable trailer mechanism in combination with a boat, thereby dispensing with a trailer as a separate unit.

Another object is to provide trailer mechanism of the character hereinafter described which may be adjusted from an operative trailer position to an inoperative position when the boat is ready for launching, in which the trailer wheels and the trailer hitch may be easily removed or replaced and without any special tools or equipment.

A still further object is to provide a limited number of parts thereby minimizing the cost of the trailer and to provide a combination which requires a minimum of storage space.

The transporting of small water crafts, launches, rowboats, skiffs or the like over the highways from the place of storage to a body of water or from one body of water to another has heretofore required the use of a separate trailer and the mounting of the water craft thereon. These trailers have been pivotally and removably attached to a motor vehicle. It is the prime object of this invention to provide trailer wheels mounted to the water craft and adjustable between operative and inoperative positions, and a motor car hitch mounted on and attached to the craft, thereby eliminating the body of a trailer for supporting the craft, and making the craft itself in effect a trailer body supporting the wheels and hitch.

The device illustrated, described, and claimed herein permits the wheels to be placed between the stern and prow of the craft, or, if preferred, at any point more nearly toward the stern thereof. The wheels are resiliently mounted and may be moved to a position relative to the craft so that they will be out of the water when the craft is launched and is being used, or they may be removed entirely by a simple manipulation of the mounting elements. Also, the hitch may be adjusted at any suitable angle relative to the prow or may be removed from the craft if desired.

The arrangement comprising my invention is simple in construction, economical to manufacture, and easy to mount and manipulate by the owner without special equipment.

Other objects will become apparent from the following description of the drawings in which:

FIG. 5 is an enlarged fragmentary view in vertical cross-section of the portion of the shaft and the spring mounting and taken substantially on the line 5—5 of FIG. 1.

FIG. 6 is an enlarged view in side elevation illustrating the trailer hitch for attaching the craft to the rear of an automobile.

FIG. 7 is a plan view of the hitch as seen from the top relative to FIG. 6.

FIG. 8 is a fragmentary view of the bow or prow of the boat illustrating an arrangement of mounting of the hitch to accommodate it to the design or contour of the prow.

FIG. 9 is an enlarged detail taken transversely relative to the shaft, taken substantially on the line 9—9 in FIG. 5.

Figure 1:
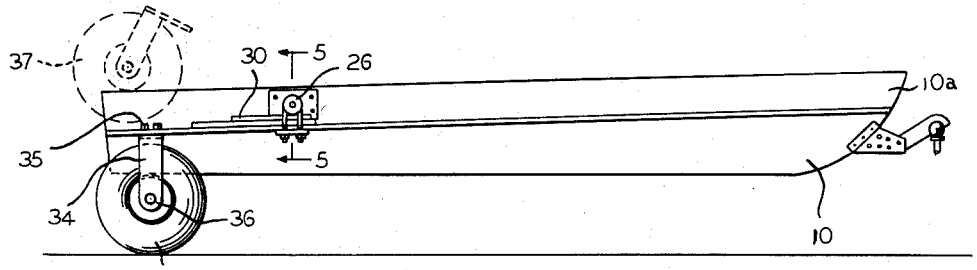
FIG. 1 is a view in side elevation of a boat showing the trailer wheels mounted thereon adjacent the stern, and the trailer hitch mounted on the prow of the craft, the trailer wheels being also shown in phantom in a position where they will be disposed when the craft is launched and in use.

The boat or water craft 10 which obviously may be of any desired shape or contour and length is provided with a shaft 11 preferably of tubular construction and having at each end an insert 12 (see FIG. 5), provided with a threaded recess 13 threadably receiving the bolt 25. As indicated in FIG. 5, the shaft or tube 11 extends through a mounting or bracket 14 at each end, each bracket 14 being substantially identical to the other and having semi-cylindrical portions 15 the side disposed in opening 10A in walls 16 of the boat 10 and secured thereto by means of side plate 17 which is provided with a flange 18 of a size and contour to fit the semi-spherical portion 15 on the bracket 14, and held in position to the side walls 16 of the boat 10 by means of bolts and nuts 19 or other suitable means (not shown). Integral with the bracket 14 is a collar 14' embracing shaft 11 and secured thereto by means of a bolt 21 extending through the the collar 14', shaft 11 and insert 12 and secured thereto by means of a nut 21'.

Figure 4:
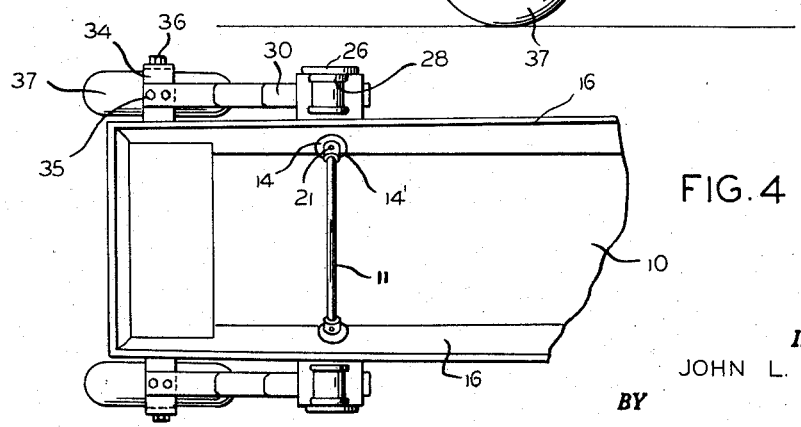
FIG. 4 is a fragmentary plan view as seen from the top relative to FIG. 2, further illustrating the mounting elements supporting the wheels.

It will be noted that in FIG. 4 the side walls 16 of the boat 10 are illustrated as sloping upwardly and outwardly from the bottom whereas in FIG. 5 the wall 16 slopes upwardly and inwardly from the bottom (not shown). This suggests that the bracket 14 and side plate 17 may, by reason of the semi-spherical shape of the portion 15 and flange 18 on the plate 17, be arranged to accommodate the side wall regardless of the angle as will more specifically hereafter appear.

The shaft 11 extends across the interior of the boat (see FIG. 4) substantially parallel to the boat bottom and through each of the brackets to the exterior of the boat 10 to provide exteriorly on each side a hub portion 11A. Radially of the hub portion 11A and exteriorly of the boat, the brackets 14 are each provided with an annular serrated edge 24 which is complementary to the serrated edge 23 on the adjustable spring mounting 22 is supported on the hub portion 11A of the shaft 11 and may be moved axially thereof for subsequent rotation thereon. A plate 26 disposed adjacent the hub portion 11A of shaft 11, is retained thereon by means of a bolt 25 threaded into the recess 13 in the insert 12. Thus the spring support or mounting 22 is normally held with its serrated edge 23 engaged with the serrated edge 24 on the bracket 14 and against rotation on the shaft 11.

Figure 2:
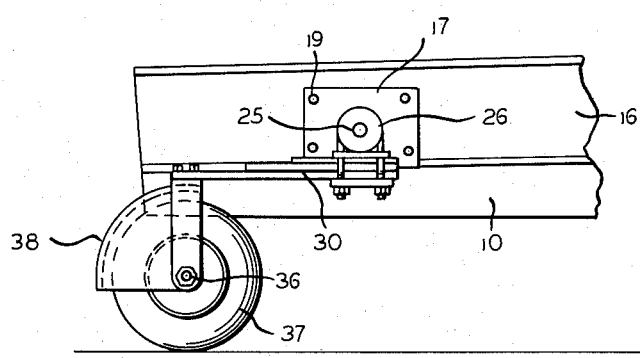
FIG. 2 is a fragmentary view in enlarged detail of the rear portion of FIG. 1 illustrating the wheel mounting elements on the craft.
Figure 3:
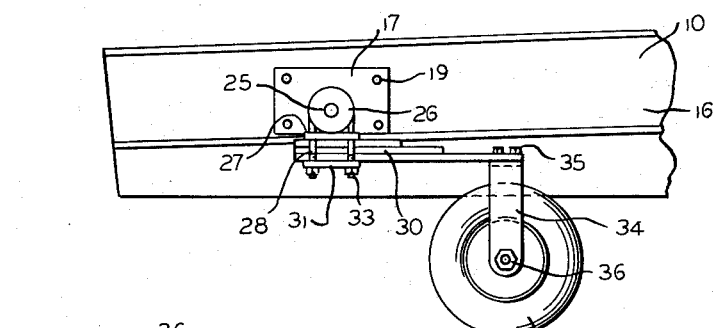
FIG. 3 is a view similar to FIG. 2 but illustrating an alternative manner in which the wheels may be mounted to dispose the wheels forwardly of the stern of the boat.

The outer surface of the spring mounting 22 radially of the shaft 11, defines a U-like surface and terminates in a plate 27 as an integral part of the mounting 22 and extending transversely of the shaft 11 in parallel relation to a plane coincident with the axis of the shaft 11. This plate 27 is provided, adjacent each side of the support 22, with a pair of relatively spaced apertures 29. A pair of relatively spaced U-bolts 28 embrace the support 22 and extend through corresponding apertures 28 in the plate 27 and through a clamping plate 31. As indicated, the clamping plate 31 is disposed beneath the leaf springs 30 and is clamped by means of lock washers 32, nuts 33 on the U-bolts 28 to secure the leaf springs 30 between the two plates 27 and 31. As shown in FIGS. 1, 2 and 3, the leaf springs 30 extend from mounting 22 toward the stern of the boat 10, the lower of the springs being secured at its rear or free end to an inverted U-like yoke member 34 by means of bolts 35. A rubber tired wheel 37 is rotatably carried by depending legs of each yoke member 34 by means of a shaft 36 carried by said legs.

Without alteration of any of the elements, the spring 30 may be mounted as shown in FIG. 3 to dispose the wheels 37 forwardly of the stern of the boat and more toward the intermediate section of the boat 10.

From the foregoing, it will be apparent that the wheels 37 may be positioned relative to the boat as shown in FIGS. 1, 2 and 3 or may by selected relationship of the serrated end 23 and 24 (FIG. 5) be raised or lowered relative to the boat or, if the boat is to be launched, may be raised to and supported in a position such as indicated by the broken lines in FIG. 1. If desired a mud guard 38 may be mounted on the yoke member 34 to prevent splashing of mud, slush or water by the wheel 37.

The adjustment of the wheel 37 to any of the various positions is accomplished by releasing the bolt 25 and moving plate 26 axially away from the support 22, then sliding the support 22 on the shaft 11 to disengage the serrated edges 23 and 24 and rotating the support 22 with the springs 30, yoke 34 and wheel 37 about the shaft 11 to a position relative to the boat as previously indicated. When the wheels 37 have been placed in a predetermined position relative to the boat the supports 22 with the springs 30 and wheels 37 will be moved inwardly on the shaft 11 to engage the serrated ends 23 and 24 and the plate 26 secured in position by means of the bolt 25.

The hitch arrangement shown in FIGS. 6, 7 and 8 for attaching the prow 10A to the rear of a vehicle (not shown) comprises a pair of relatively spaced side plates 39 and 39' each pivotally hinged to a pin 40, which in turn is embraced by a pair of relatively spaced and divergent plates 41 and 41'. These plates 41 and 41' are each provided with a plurality of apertures 42 to accommodate screws or bolts 43 adapted to attach the plates 41 and 41' on the exterior of the sides of the boat 10 adjacent the forward end or prow 10A, as shown in FIG. 8.

The side plates 39 and 39' are spaced apart from one another as shown in FIG. 7, and are each provided with a plurality of apertures 44 arranged in any predetermined relation to each other and to the corresponding apertures in the other plate. A bar member 45', serving as the link or draw bar, is disposed between the plates 39 and 39' and is secured in position therebetween by means of the bolts 47 which extend through the apertures 44 in the plates 39 and 39' and through the bar 45. As will be apparent, the relative relationship of the apertures 44 in the plates 39 and 39' permits arranging the bar 45 in either of several predetermined angles relative to a horizontal plane so that the boat 10 may be attached to a vehicle (not shown) and supported with its keel substantially parallel to a horizontal plane.

In the embodiment of the hitch shown in FIGS. 6, 7 and 8, the front end of the bar 45 is provided with hook-like portion 45' designed to embrace a spherical end 46 of a pin 46' designed for attachment to a vehicle (not shown) by means (not shown) but in common use. The forward end of the bar 45 is recessed on its under side at 48 to receive a clamping block 49 which engages the spherical end 46 opposite the hook-like portion 45'. The block 49 is held in this position by means of bolt 50 and nut 51.

From the foregoing it will be observed that I have provided a novel combination of trailer mechanism which may be combined with water craft which for the purpose of transportation on land is in effect a trailer body. The mounting of the leaf springs permits adjustment of the wheels to any desired position with reference to the bottom of the boat, so that when the boat is launched, the wheel may be positioned above the water level. As indicated, the wheels may be positioned at the rear end of the boat or forwardly thereof as shown in FIG. 3 by merely reversing the leaf springs in their mountings. Also the angle of the boat when being towed, may be changed by proper adjustment of the hitch with reference to the bow of the boat. Obviously the disclosed arrangement is easy to assemble and adjust the does not require special tools. If desired, it may be easily removed. It will be understood that modifications may be incorporated without departing from the spirit of my invention and that the scope of the appended claims should be interpreted to contemplate such modifications.

I claim and desire to secure by Letters Patent as follows:

In combination with a water craft having a stern, relatively spaced side walls and a prow, of a shaft extending between and through each wall to the exterior thereof, a pair of brackets each having a semi-spherical surface and embracing said shaft, one bracket disposed in side of said craft and the other bracket disposed in the other side of said craft, a side plate secured to each side exteriorly thereof and having a portion contoured and complementary to the semi-spherical surface of an adjacent bracket, means securing said bracket to said shaft and to said side plates, said semi-spherical portion of each bracket having exteriorly of said craft provided with a serrated edge disposed annularly about and radially of said shaft, a pair of spring mountings each rotatably and slidably disposed on said shaft exteriorly of said craft and adjacent one of said brackets, each of said mountings having a serrated edge complementary to the serrated edge of an adjacent bracket and normally engaged therewith, whereby said mounting is normally held against rotation on said shaft, releasable means carried by each end of said shaft and normally holding said mountings with said serrated edges in engagement and said mountings against sliding motion on said shaft, a pair of leaf springs each having one end releasably secured to one of said mountings, said leaf springs extending from said mountings in a direction relatively parallel to each other and normal to the axis of said shaft, an inverted U-like yoke member secured to the free end of each of said leaf springs and depending therefrom, a wheel disposed between the depending legs of each yoke member and rotatably carried thereby, and a hitch attached to the bow of said craft adapted for connection with the rear of a vehicle to be towed thereby.

References Cited in the file of this patent
UNITED STATES PATENTS

| | | |
|---|---|---|
| 212,076 | Wilder | Feb. 4, 1879 |
| 2,171,889 | Payson | Sept. 5, 1939 |
| 2,662,236 | Kester | Dec. 15, 1953 |
| 2,774,612 | Evans | Dec. 18, 1956 |
| 2,874,391 | Renfroe | Feb. 24, 1959 |
| 2,960,056 | Puccinelli | Nov. 15, 1960 |